(12) United States Patent
Orlach

(10) Patent No.: US 8,664,606 B2
(45) Date of Patent: Mar. 4, 2014

(54) INFRARED RADIATION DETECTOR

(75) Inventor: Bertrand Orlach, Voreppe (FR)

(73) Assignee: Societe Francaise de Detecteurs Infrarouges—Sofradir, Chatenay Malabry (FR)

( * ) Notice: Subject to any disclaimer, the term of this patent is extended or adjusted under 35 U.S.C. 154(b) by 157 days.

(21) Appl. No.: 13/299,749

(22) Filed: Nov. 18, 2011

(65) Prior Publication Data

US 2012/0138802 A1     Jun. 7, 2012

(30) Foreign Application Priority Data

Dec. 2, 2010 (FR) .................................... 10 59996

(51) Int. Cl.
*G01J 5/06* (2006.01)
(52) U.S. Cl.
USPC .......................................................... 250/352
(58) Field of Classification Search
CPC ......................................................... G01J 5/061
USPC .......................................................... 250/352
See application file for complete search history.

(56) References Cited

U.S. PATENT DOCUMENTS

| | | | | |
|---|---|---|---|---|
| 3,999,403 A | * | 12/1976 | Bower et al. .................... | 62/51.2 |
| 4,844,486 A | * | 7/1989 | Schiemann .................... | 277/636 |
| 5,382,797 A | * | 1/1995 | Kunimoto et al. ............ | 250/352 |
| 5,932,360 A | * | 8/1999 | Hazlitt et al. ................. | 428/621 |
| 5,994,702 A | | 11/1999 | Clynne et al. | |
| 2010/0264252 A1 | | 10/2010 | Preston et al. | |

FOREIGN PATENT DOCUMENTS

| | | |
|---|---|---|
| FR | 2913768 A1 | 9/2008 |
| JP | 01168887 A * | 7/1989 |

OTHER PUBLICATIONS

Preliminary Search Report for French application No. 1059996. dated Aug. 16, 2011.

* cited by examiner

*Primary Examiner* — Constantine Hannaher
(74) *Attorney, Agent, or Firm* — Heslin Rothenberg Farley & Mesiti P.C.

(57) ABSTRACT

An infrared radiation detector includes: a cryostat having a cold finger ensuring heat exchange with a cold source and a window transparent to infrared radiation to be detected; a mechanically fixed cold plane in heat exchange with the cold finger; a detector unit comprising at least a detector circuit sensitive to the infrared wavelength range to be detected, and in direct or indirect heat exchange with the cold plane; and a mechanically fixed cold shield in heat exchange with the cold plane and limiting stray radiation. The cold shield is rotationally symmetrical. An inside wall of the cold shield has a succession of reliefs distributed in at least one helical pattern. A definition axis of the helical pattern coincides with the axis of revolution of the cold shield.

5 Claims, 2 Drawing Sheets

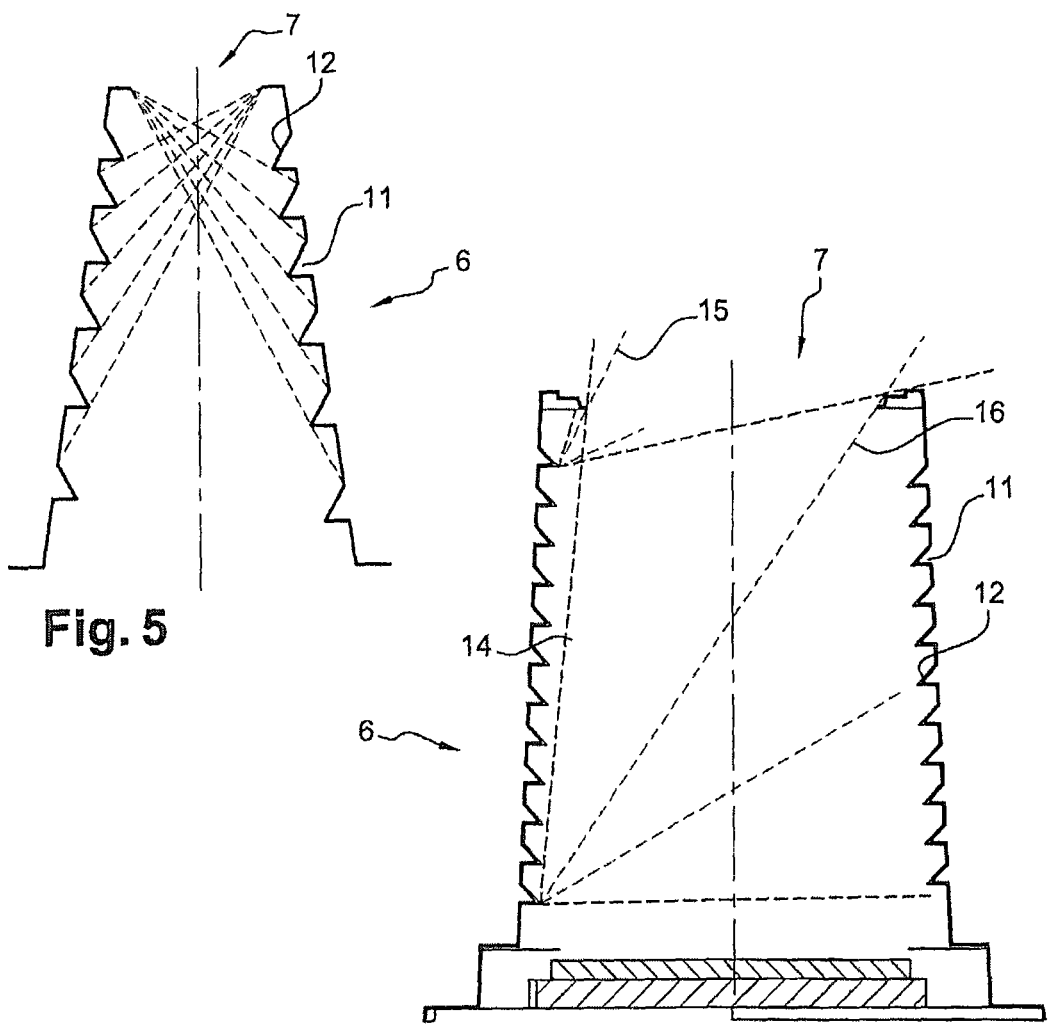
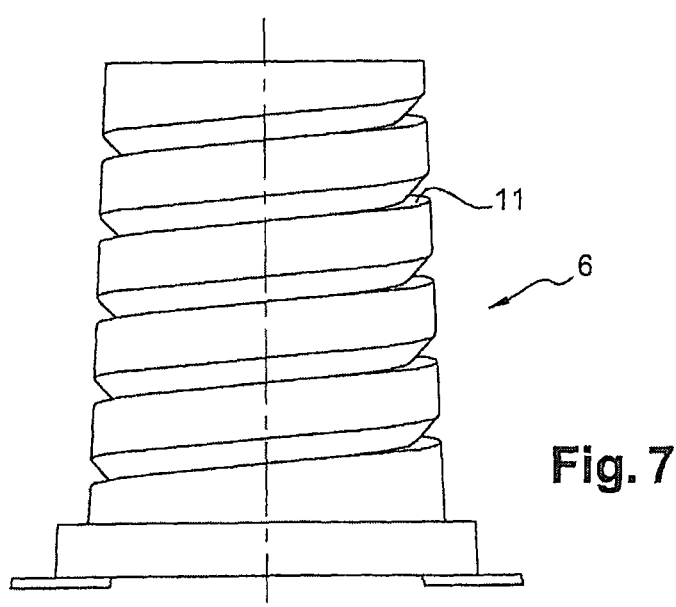

INFRARED RADIATION DETECTOR

CROSS REFERENCE TO RELATED APPLICATIONS

This application claims priority of French application No. 1059996 filed on Dec. 2, 2010, the entire contents of which is hereby incorporated by reference herein.

FIELD OF THE INVENTION

The invention relates to the field of infrared detectors, more especially those that operate at low temperature, i.e. typically at temperatures from 50 to 200 degrees Kelvin (K).

The operation of such low-temperature infrared detectors is based on the quantum principle and they are generally associated with a vacuum-sealed case (cryostat). The actual detector itself consists of a plurality of unitary or elementary detectors referred to as photo sites, which are associated with a readout circuit, with this assembly, commonly referred to as a "detector unit", being mechanically fixed and in heat exchange with the cryostat's cold finger so that said detector is kept at the desired temperature.

These devices generally comprise a cold shield which is open at its apex, said opening defining a field stop intended to limit stray reflections caused, in particular, by "unwanted" radiation after said radiation has been reflected and/or refracted on and in the materials of the detector circuit and/or evaluation circuit. When it impinges on the photo sites, such radiation generates incoherent electrical signals which adversely affect the electro-optical performance of the system which, in the absence of such stray radiation, would otherwise achieve roughly its theoretical accuracy.

More particularly and especially in the case of detecting weak-signal infrared radiation, attempts are made to overcome noise that originates precisely from unwanted infrared flux that is out of the field of view and which is reflected on the internal components of the cryostat.

BACKGROUND OF THE INVENTION

In order to overcome this difficulty and thus minimize this extraneous flux, there have been suggestions, for instance, to cover certain internal components in the cryostat with a material that absorbs the wavelengths of the stray infrared radiation at angles of incidence that are as high as possible in relation to normal to the surface.

There have also been suggestions to fit, at the level of the internal face of the cold shield, a certain number of radially directed baffles whose function is to stop or outwardly reflect incident rays in a direction other than that of the detector's nominal field of view.

The drawback of these baffles is the fact that they are fitted on the internal face of the cold shield by bonding, especially by using an epoxy resin. Apart from the fact that fixing the baffles involves a time-consuming and awkward operation that makes it more expensive to produce such a detector, experience shows that the epoxy resin used to ensure this bonding causes outgassing which, sooner or later, affects the efficiency of the detector which is generally vacuum sealed.

FIG. 1 schematically shows a quantum infrared detector, i.e. a quantum infrared detector of a type that is known in itself and which is designed to operate at low temperature.

Basically, it comprises a cryostat or chamber 1 whereof the cold finger 2 is connected to a cold source (not shown). The upper part of this cryostat is closed by a window 3 that is transparent to the infrared radiation that is to be detected.

A cold plane 4 which is in heat exchange with cold finger 2 is mechanically fixed to the upper end of the cold finger 2 of cryostat 1. Reference 5 denotes the infrared detector unit which is itself in heat exchange with cold plane 4. This detector unit typically consists of a plurality of elementary detectors associated with an evaluation circuit capable of converting the signals output by these detectors into usable electrical signals. The resulting information is transmitted to the cryostat's external environment by connections, especially wired connections, which are not shown in order not to include unnecessary details in the figure.

A cold shield 6 which also comprises an opening 7 that faces window 3, which is transparent to the infrared radiation that is to be detected, in the upper end of the cryostat is also mounted on cold plane 4. This opening 7 acts as a field stop.

This diagram shows, firstly, by an arrow that is substantially perpendicular to the detector unit 5, the wanted infrared radiation located in the detector's field of view and, secondly, by a diagonal arrow that is reflected on the side wall of cold shield 6, stray radiation that is not in the detector's field of view and which is therefore to be eliminated.

FIG. 2 shows a cold shield according to the prior art which uses radial baffles 8. These metal baffles are generally of the same type as the cold shield, are parallel to each other and are fitted on the internal face 10 of the cold shield. The latter is a rotationally symmetrical type cold shield. It defines a surface 9 at its base which substantially corresponds to the useful surface area of the detector, i.e. the surface area of the material that is sensitive to the infrared radiation that is to be detected.

SUMMARY OF THE INVENTION

The present invention aims to obviate the need to use such baffles or at least reduce their number. Nevertheless, it remains within the scope of the above-mentioned type of technology, i.e. technology intended to eliminate stray radiation due to said radiation being reflected out of the field of view of the elementary detectors or photo sites.

To achieve this, the invention relates to an infrared radiation detector comprising:
- a cryostat equipped with a cold finger capable of ensuring heat exchange with a cold source and a window that is transparent to the infrared radiation that is to be detected;
- a mechanically fixed cold plane that is in heat exchange with the cold finger;
- a detector unit comprising at least a detector circuit that is sensitive to the infrared wavelength range that is to be detected and is in direct or indirect heat exchange with the cold plane;
- a mechanically fixed cold shield that is in heat exchange with the cold plane and capable of limiting any stray radiation, said cold shield having one axis of revolution.

According to the invention, the internal wall that defines the cold shield has a succession of reliefs distributed in a helical pattern, the axis whereof coincides with the definition axis and the axis of revolution of the shield.

In other words, the invention involves providing the inner wall of the cold shield with a special profile capable of causing stray radiation to be reflected out of the detector's field of view with this profile being an integral part of the wall that defines said cold shield, i.e. obviating the need for fixing by any additional elements capable of ensuring the function fulfilled by baffles in detectors according to the prior art.

The special profile of the wall, at least the internal profile, of the cold shield has an edge that is not perpendicular to the main direction of the incident flux, i.e. the wanted radiation, in order to obtain maximum reflection of virtually all the stray radiation.

The pitch of the helix can be constant or variable. In addition, two or even more than two helixes can be provided.

According to the invention, the cold shield is produced by electrically depositing nickel or copper in a mold capable of defining the desired profile.

The dimensions and the diameter of the shield are determined depending on the diagonal width of the detection component of the photo site or of the plurality of photo sites and the desired viewing angle.

BRIEF DESCRIPTION OF THE DRAWINGS

The way in which the invention is implemented and its resulting advantages will be made more readily understandable by the description of the following embodiment, given merely by way of example, reference being made to the accompanying drawings.

FIG. 5 is a schematic longitudinal cross-sectional view of the cold shield according to the invention showing a helix having a pitch that is larger at its base than at the level of the field stop.

FIG. 6 is also a schematic longitudinal cross-sectional view of the cold shield according to the invention showing a helix with a constant pitch and illustrating the optical path of certain incident rays.

FIG. 7 is a schematic perspective view of the cold shield according to the invention, also with a helix having a constant pitch.

DESCRIPTION OF THE PREFERRED EMBODIMENTS

Figure 1:
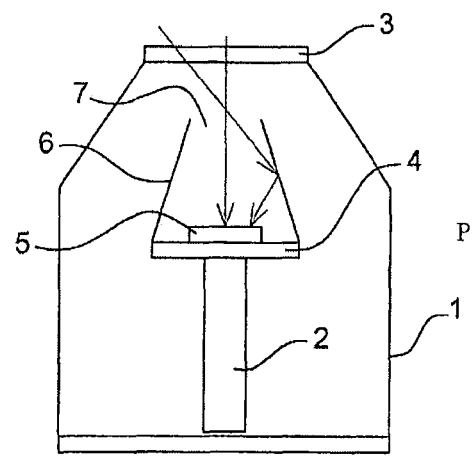
FIG. 1 is a schematic view of an infrared detector of a type that is known in itself.
Figure 2:
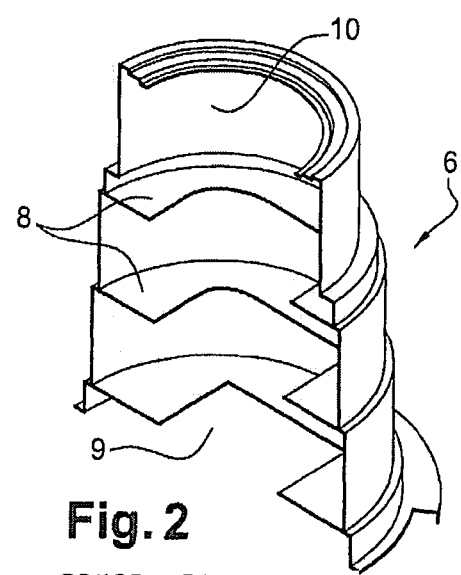
FIG. 2 is a schematic partial perspective view of a cold shield according to the prior art.
Figure 3:
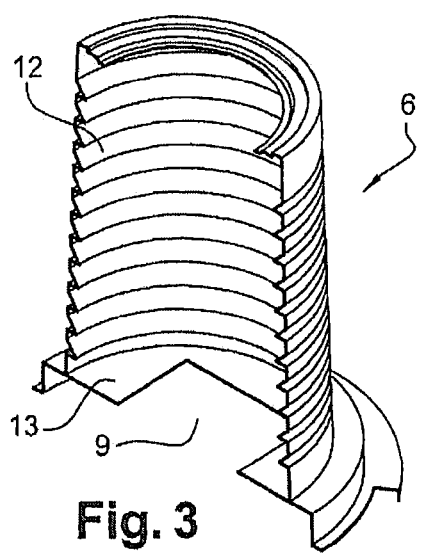
FIG. 3 is a schematic partial perspective view of a cold shield according to the invention.
Figure 4:
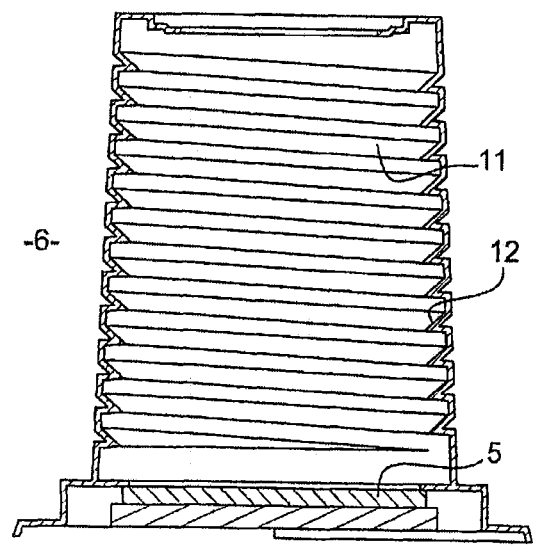
FIG. 4 is a longitudinal cross-sectional view of the cold shield in FIG. 3.

FIGS. 3, 4 and 6 illustrate the general principle underlying the invention. Thus, cold shield 6 has a circular, tapered cone shape with the frustrum that constitutes the envelope of said shield being defined relative to an axis of revolution that is shown by the dashed lines in FIGS. 5 to 7.

Cold shield 6 consists of a metal support made of a nickel or copper-based alloy and having a defining side wall which has a particular profile. This particular profile is the result of a helix whose definition axis coincides with the shield's axis of revolution.

The pith of the helix can be variable, as shown in FIG. 5, in order to reduce the mass of the shield and, consequently, optimize its mechanical strength.

This pitch can, however, be constant, as shown in FIGS. 3, 4, 6 and 7.

Even though this is not shown in the drawings, one can even provide two helixes or several helixes in order to optimize the potential reflection density of the particular profile that is generated.

It is apparent, especially in FIGS. 5 and 6, that this helix 11 defines, at the level of the internal side wall 10, reflection surfaces 12 that are not perpendicular to the main direction of the useful radiation. This significantly optimizes the reflection of stray radiation 14, 15, 16 and, consequently, the electro-optical performance of the device.

According to the invention, this cold shield is obtained using electrodeposition technology based on a mold made of an aluminum-based alloy, for example, which has the required profile for the shield.

This way, it is possible to use a technology that is currently well mastered, namely electrodeposition, to obtain a cold shield that has optimized properties for reflecting stray radiation without the need to add or attach any additional elements such as baffles, thereby making it possible to significantly reduce the operations involved in producing the shield and, consequently, making it cheaper to manufacture. In the embodiment described in relation to FIG. 3, lower baffle 13 has been retained. Nevertheless, it is perfectly possible to omit it.

In addition, because of the absence of any bonding of any kind whatsoever, especially using epoxy resin (except in cases where lower baffle 13 is retained), the risks of outgassing which can compromise the longevity of such a detector in a known manner, are eliminated.

The invention claimed is:

1. An infrared radiation detector comprising:
a cryostat having a cold finger ensuring heat exchange with a cold source, and a window transparent to infrared radiation to be detected;
a mechanically fixed cold plane in heat exchange with the cold finger;
a detector unit comprising at least a detector circuit sensitive to an infrared wavelength range to be detected, and in direct or indirect heat exchange with the cold plane;
a mechanically fixed cold shield in heat exchange with the cold plane and limiting stray radiation, said cold shield having an opening at one end aligned with the cryostat window, an internal wall extending away from said opening, and one axis of revolution;
wherein the internal wall has a succession of reliefs distributed in at least one helical pattern, the at least one helical pattern having a definition axis that coincides with the axis of revolution of the cold shield.

2. The infrared radiation detector as claimed in claim 1, wherein each relief has an edge that is not perpendicular to a main direction of incident flux.

3. The infrared radiation detector as claimed in claim 1, wherein the at least one helical pattern has a constant pitch.

4. The infrared radiation detector as claimed in claim 1, wherein the at least one helical pattern has a pitch that varies with distance from said opening.

5. A method of providing the infrared radiation detector as claimed in claim 1, wherein the cold shield is produced by electrically depositing nickel or copper on a mold having a profile corresponding to the succession of reliefs distributed in the at least one helical pattern.

* * * * *